(12) United States Patent
Smith

(10) Patent No.: US 6,608,008 B1
(45) Date of Patent: Aug. 19, 2003

(54) LITHIUM HYDROXIDE COMPOSITIONS

(75) Inventor: W. Novis Smith, Philadelphia, PA (US)

(73) Assignee: Toxco Inc., Anaheim, CA (US)

( * ) Notice: Subject to any disclaimer, the term of this patent is extended or adjusted under 35 U.S.C. 154(b) by 306 days.

(21) Appl. No.: 09/665,879

(22) Filed: Sep. 20, 2000

(51) Int. Cl.[7] ................... C10M 125/10; C01D 15/02
(52) U.S. Cl. ................ 508/154; 423/641; 423/646
(58) Field of Search ................ 423/641, 646; 508/154

(56) References Cited

U.S. PATENT DOCUMENTS

| | | | | |
|---|---|---|---|---|
| 3,929,651 A | * | 12/1975 | Murray et al. | 508/512 |
| 4,012,330 A | * | 3/1977 | Brewster | 508/508 |
| 4,036,713 A | * | 7/1977 | Brown | 205/536 |
| 4,207,297 A | * | 6/1980 | Brown et al. | 423/179.5 |
| 4,444,669 A | * | 4/1984 | Wittse, Jr. et al. | 508/512 |
| 4,483,776 A | * | 11/1984 | Witte, Jr. et al. | 508/512 |
| 4,582,619 A | * | 4/1986 | Carley et al. | 508/512 |
| 5,948,736 A | * | 9/1999 | Smith et al. | 508/178 |
| 6,153,563 A | * | 11/2000 | Smith et al. | 508/154 |

\* cited by examiner

Primary Examiner—Ellen M. McAvoy
(74) Attorney, Agent, or Firm—John Lezdey & Assoc

(57) ABSTRACT

There is provided concentrated aqueous solutions of highly pure lithium hydroxide essentially free of carbon dioxide, packaged in an inert atmosphere.

5 Claims, No Drawings

LITHIUM HYDROXIDE COMPOSITIONS

BACKGROUND OF THE INVENTION

1. Field of the Invention

The invention concerns producing high purity lithium hydroxide solutions for use in industrial applications.

2. Description of the Prior Art

Lithium compounds are being used in many commercial applications including the production of lubricating greases, glass and ceramics, aluminum, in swimming pool sanitizers, air conditioning and refrigeration systems, primary and secondary batteries, nuclear energy production and in the synthesis of psychotropic drugs. Most of these uses require lithium compounds of high purity.

Lithium hydroxide is an intermediate reactant used in the production of lithium salts such as lithium acetate, lithium fluoride, lithium benzoate, lithium bromide, lithium chloride and lithium nitrate. Some of these salts in turn are intermediates for making high purity lithium perchlorate, lithium tetrafluoroborate and lithium hexafluorophosphate battery electrolyte solutions useful in high energy batteries.

However, the lithium hydroxide application most concerned with in this invention is as an additive in manufacturing high quality and high performance lithium lubricating greases. In this application, the lithium hydroxide must conform to specifications restricting the amount of lithium carbonate to less than 0.5% (0.3% carbon dioxide) by weight, sulfate levels below 500 ppm and a maximum residual chloride of 0.05% with a content of 0.01% being more typical. The lithium hydroxide to be used in greases must contain a minimum of chloride and sulfate ions due to their corrosion potential. The lithium carbonate must be minimized because it is much less reactive and remains as an abrasive grit in the grease.

Lithium hydroxide is sold as the solid monohydrate, i.e., $LiOH.H_2O$. This solid produces a dust when handled which is extremely choking. Persons handling $LiOH.H_2O$ and users complain about this dust. Plain LiOH with no water is even dustier and much harder to produce. The major use of this product is in the production of lithium greases whereby it is added to the reactor containing some water and vegetable or animal fat and other additives and heated until completely dissolved and reacted. The water is then removed by further heating under vacuum.

U.S. Pat. No. 3,597,340 issued to Honeycutt et al, relates to the recovery of lithium hydroxide monohydrate from aqueous chloride brines containing both lithium chloride and sodium chloride, by electrolyzing the brines in a diaphragm cell which maintains a separation between the anolyte and catholyte; the diaphragm being of the conventional asbestos fiber mat type.

U.S. Pat. No. 4,036,713 to Brown describes a process in which a brine containing lithium and other alkali and alkaline earth metal halides is preliminary concentrated to a lithium content of about 2 to 7 percent to precipitate almost all of the alkali and alkaline earth metals other than lithium, adjusting the pH of the concentrated brine to a range of about 10.5 to 11.5, thus precipitating all of any remaining calcium, magnesium and iron contaminants, neutralizing the brine with hydrochloric acid, electrolyzing the treated brine as the anolyte in the electrolytic cell in which a cation selective permeable membrane separates the anolyte from the catholyte, the lithium ions in the anolyte migrate through the membrane to form high purity lithium hydroxide in the catholyte and hydrogen and chlorine are evolved at the electrodes as by-products.

From the foregoing, it is apparent that all previous methods have involved difficult or expensive separations, and have not always provided lithium hydroxide of sufficient purity for use in grease compositions. Although the prior art indicates a high purity product, none indicate a substantially lithium carbonate-free lithium hydroxide solution required as a high performance lubricating grease.

SUMMARY OF THE INVENTION

In accordance with this invention, there is provided highly concentrated aqueous solutions, lithium hydroxide of high purity packaged under a carbon dioxide-free atmosphere or inert atmosphere.

The present compositions are advantageous not only in that concentrated aqueous solutions of lithium hydroxide in high purity are provided but that the preparation and storage requires no special equipment and utilizes a raw material which is commercially available at relatively low cost. By the term "high quality" is meant that the lithium hydroxide contains less than 0.2 weight percent carbon dioxide (or as 0.34% lithium carbonate) as measured by the content of lithium carbonate, containing a maximum residual chloride of 0.05% with a typical content of 0.01% chloride. The product of this invention is particularly useful for use in the manufacture of lubrication greases. Further it can be used to purify $LiOH.H_2O$ which is highly contaminated with lithium carbonate.

More specifically, the compositions of this invention can be achieved by the steps of:

a) providing a concentrated or saturated aqueous solution of lithium hydroxide monohydrate;

b) filtering said concentrated aqueous solution to remove the cumulative solids including lithium carbonate; and c) recovering the filtrate consisting of lithium hydroxide essentially free of carbon dioxide as measured by the lithium carbonate content;

wherein the steps b) and c) are carried out in a carbon dioxide-free atmosphere or inert atmosphere to obtain a concentrated solution containing about 8 to 22% lithium hydroxide, and d) maintaining the solution in a carbon dioxide free atmosphere in a container prior to use.

The method of preparation is conducted at a temperature in the range of from about ambient temperature to about 100° C. and preferably in the range of from about 20° to about 80° C.

The carbon dioxide-free atmosphere and inert atmosphere useful in the present invention is any suitable dry inert gas generally argon, helium, and nitrogen are used with the later being preferred. Air which has been scrubbed free of carbon dioxide can also be used. The concentrated aqueous solution of high purity lithium hydroxide is recovered and packaged under a carbon dioxide-free or inert atmosphere, preferably, under a nitrogen blanket. This concentrated aqueous solution is easier to ship than the solid, and is relatively compact even if the water to the calculated lithium hydroxide monohydrate ratio is 4:1.

The solution may also be dried or lyophilized to obtain the purified monohydrate.

Another method for preparing concentrated aqueous solutions of high purity lithium hydroxide essentially free of carbon dioxide, measured as lithium carbonate of the invention comprises the steps of:

a) dissolving a sufficient amount of $LiOH.H_2O$ in distilled or deionized water to provide a concentrated solution in excess of 10.3 percent by weight;

b) filtering said concentrated solution to remove essentially all of the lithium carbonate and other solids;

c) recovering the filtrate consisting of an aqueous solution containing about 10.3 percent by weight or higher lithium hydroxide substantially free of carbon dioxide; and d) packaging said aqueous solution, thus providing a concentrated aqueous solution of high purity lithium hydroxide under a nitrogen atmosphere or carbon dioxide-free atmosphere.

Steps b), c) and d) are carried out in a nitrogen atmosphere or carbon dioxide free atmosphere.

The concentrated aqueous solution of high purity lithium hydroxide is provided at a concentration of from about 8 to about 12 weight percent. Such concentration provides water to contained lithium hydroxide calculated as the monohydrate at a weight ratio of about 4:1.

It is, therefore, a primary object of the present invention to provide a concentrated aqueous solutions of high purity lithium hydroxide substantially free of $CO_2$ as lithium carbonate, namely, less than 0.35 percent by weight.

It is another object of the invention to provide a packaged concentrated aqueous solution of high purity lithium hydroxide in a carbon dioxide-free atmosphere or an inert atmosphere such as argon, nitrogen or helium.

It is still another object of the invention to provide a concentrated aqueous solution of highly pure lithium hydroxide from which an essentially carbon dioxide-free product can be utilized in the manufacture of high performance lubricating greases.

These and other objects of the invention, which will become apparent, hereinafter, are achieved by the following process.

DETAILED DESCRIPTION OF THE PREFERRED EMBODIMENTS

In accordance with this invention, there is provided concentrated aqueous solutions of lithium hydroxide substantially carbon dioxide-free (which is present as lithium carbonate). To meet the requirements of lithium-based high performance greases, it is desirable to have high purity maximum concentration lithium hydroxide for use in making lithium chemicals and greases. However, lithium carbonate usually present in varying amounts in the starting lithium hydroxide monohydrate due to absorption of carbon dioxide from the air is a major contaminant. Lithium carbonate is a much slower reactant than lithium hydroxide in most chemical reactions, and is insoluble thus it is desirable to minimize the amount present in the concentrated aqueous solutions of high purity lithium hydroxide.

The solubility of lithium hydroxide (or as the monohydrate) in water increases with temperature. At room temperature (about 22° C.), the solubility of lithium hydroxide is about 11% (equivalent of 18% $LiOH.H_2O$). At 100° C. the solubility is about 24%. On the other hand, the solubility of the lithium carbonate in water decreases with the temperature from 1.54% at 0° C. to 0.75% at 100° C. It has now been found that lithium hydroxide depresses the solubility of lithium carbonate in water and this phenomenon combined with the respective solubility properties of the two lithium compounds is used to remove as much of the lithium carbonate as possible. A saturated solution of lithium hydroxide is made up which can be at any temperature from about 5° C. to about 100° C. and then filtered under a carbon dioxide-free or inert gas atmosphere. The higher the temperature, the higher the concentration of lithium hydroxide (and the monohydrate) and/or the higher the temperature at which the filtration is carried out, the higher the purity of lithium hydroxide is with respect to the amount of dissolved lithium carbonate in the resultant lithium hydroxide solution. Therefore, the purity of the lithium hydroxide (or monohydrate) on a dry basis is being improved with respect to the contained lithium carbonate.

These concentrated aqueous solutions at room temperature are in the range of about 8 to about 11 percent lithium hydroxide. If calculated as $LiOH.H_2O$ these percentages would be in the range of about 14 to about 19% by weight of the lithium hydrate monohydrate at about 22° C.

If the lithium hydroxide solution is to be concentrated and dried to form solid lithium hydroxide monohydrate crystals, the saturation temperature for the lithium hydroxide solution should be as high as about 80° C. while the filtration to remove the lithium carbonate can be carried out slightly above this temperature from about 85° to about 90° C. These filtration temperatures insure that there will be no premature precipitation of lithium hydroxide monohydrate during filtration or in plant transfer lines prior to concentrating the solution to solid product.

The concentrated aqueous solution of highly pure lithium hydroxide prepared by the method of this invention finds utility primarily as a reactant in high performance lithium greases and as intermediate for preparing highly pure lithium products of commercial utility. For example, lithium salts which in turn are useful in the manufacture of electrolytes in high-energy density batteries and in producing high purity lithium metal.

It may also be used as a highly purified lithium hydroxide solution useful for drying to high purity hydroxide monohydrate by conventional methods such as lyophilizing.

This invention may be more fully illustrated by the following examples.

EXAMPLE 1

In a nitrogen atmosphere an excess of lithium hydroxide monohydrate (lithium carbonate content was 0.8%) was added to 1000 ml of water and stirred at 22° C. for an hour and then the excess lithium hydroxide monohydrate was allowed to settle. The supernatant was then filtered under nitrogen at 22° C. The LiOH concentration of the solution was 10.4% as determined by titration. The lithium carbonate content of the solution was 0.08% by titration. (Equivalent to lithium hydroxide monohydrate containing 0.39% lithium carbonate).

The lithium hydroxide concentration was determined by titrating a weighed 2 ml sample of the filtered lithium hydroxide solution which was added to 50 ml of distilled water which had been purged with argon for 30 minutes. All transfers and titratiohs were performed under argon. The titration was done with standardized 0.1N HCl and using a pH meter. The base was titrated to pH end point of 8.3. The titration was continued to a pH of 4.3 for the bicarbonate (half of the carbonate). The bicarbonate titration was multiplied by two for the lithium carbonate content, The lithium hydroxide content was determined by subtracting the bicarbonate titration from the base titration. The final composition was packaged under a nitrogen atmosphere.

EXAMPLE 2

The same supernatant solution as in Example 1 prior to filtration was diluted to 9.3% lithium hydroxide and then filtered. The lithium carbonate content of the filtered solution by titration was 0.08%. (Equivalent to lithium hydroxide monohydrate containing 0.49% lithium carbonate). The composition was packaged under a nitrogen atmosphere.

EXAMPLE 3

An excess of lithium hydroxide monohydrate (lithium carbonate content was 0.8%) was added to 1000 ml of water and stirred at 22° C. for an hour and then the excess lithium hydroxide monohydrate was allowed to settle. The supernatant was then filtered under nitrogen at 79° C. and maintained in a nitrogen atmosphere. The LiOH concentration of the solution was 15.5%. The lithium carbonate content of the solution was 0.06% by titration. (Equivalent to lithium hydroxide monohydrate containing 0.30% lithium carbonate). The final solution was packaged under nitrogen.

EXAMPLE 4

An excess of lithium hydroxide monohydrate (lithium carbonate content was 0.8%) was added to 1000 ml of water and stirred at 22° C. for an hour and then the excess lithium hydroxide monohydrate was allowed to settle. The supernatant was heated to 52° C. and then filtered under nitrogen. The LiOH concentration of the solution was 10.4%. The lithium carbonate content of the solution was 0.07% by titration. (Equivalent to lithium hydroxide monohydrate containing 0.3% lithium carbonate). The final solution was packaged under nitrogen.

EXAMPLE 5

In a nitrogen atmosphere an excess of lithium hydroxide monohydrate (lithium carbonate content was 0.8%) was added to 500 ml of water and stirred at 79° C. for an hour and then the excess lithium hydroxide monohydrate was allowed to settle. The supernatant was then filtered under nitrogen at 85° C. The concentrated solution was dried to the lithium hydroxide monohydrate. (The LiOH concentration of the filtered solution prior to drying was 16%). The lithium carbonate content of the lithium hydroxide monohydrate product was 0.25% by titration was packaged under a nitrogen atmosphere.

What is claimed is:

1. A package of a concentrated aqueous solution containing about 8 to 24 weight percent of lithium hydroxide containing less than 0.2 weight percent carbon dioxide in an inert atmosphere.

2. The package of claim 1 wherein said atmosphere comprises nitrogen.

3. The package of claim 1 which is substantially free of lithium carbonate.

4. The package of claim 1 comprising a concentrated in excess of 10.3 percent by weight.

5. A package containing a lyophilized concentrate solution containing about 8 to 24 weight percent of lithium hydroxide containing less than 0.2 weight percent carbon dioxide in an inert atmosphere.

* * * * *